United States Patent [19]

Quick et al.

[11] 4,401,694

[45] Aug. 30, 1983

[54] METHOD AND APPARATUS FOR AN OPTICAL SENSOR UTILIZING SEMICONDUCTOR FILTERS

[75] Inventors: William H. Quick, La Habra Heights; Kenneth A. James, Corona Del Mar; Virgil H. Strahan, Orange, all of Calif.

[73] Assignee: Rockwell International Corporation, El Segundo, Calif.

[21] Appl. No.: 137,069

[22] Filed: Apr. 3, 1980

Related U.S. Application Data

[62] Division of Ser. No. 5,532, Jan. 22, 1979, abandoned.

[51] Int. Cl.$^3$ .............................................. B05D 5/06
[52] U.S. Cl. .................... 427/162; 427/86; 427/379; 350/317; 432/18; 356/419
[58] Field of Search ................ 427/86, 166, 162, 379, 427/86; 350/311, 317, 315, 314, 168; 356/419; 73/339 R, 356, 339 C; 374/161, 162; 432/10, 18

[56] References Cited

U.S. PATENT DOCUMENTS

| | | | |
|---|---|---|---|
| 3,025,763 | 3/1962 | Schwartz et al. | 374/161 X |
| 4,136,566 | 1/1979 | Christensen | 374/161 |
| 4,278,349 | 7/1981 | Sander | 374/161 X |

OTHER PUBLICATIONS

Kachurin et al., "Annealing of Defects in Ion-Implanted Layers by Pulsed Laser Radiation", *Ion Implantation in Semiconductors*, (New York, Plenum Press, 1976), pp. 445–451.

"Piezoelectric Films", *Thin Film Phenomena* (New York, McGraw-Hill Bk. Co., 1969), pp. 477–479.

*Electronics Engineer's Handbook,* 1st edition, New York, McGraw-Hill Bk. Co., 1975, pp. 8-78 to 8-79.

*Handbook of Chemistry and Physics,* 14th edition, Cleveland, Ohio, Chemical Rubber Publishing Co., 1958, p. 1958.

*Primary Examiner*—John D. Smith
*Assistant Examiner*—Bernard F. Plantz
*Attorney, Agent, or Firm*—H. Fredrick Hamann; Morland C. Fischer

[57] ABSTRACT

A method and resulting apparatus for implementing a unique optical sensor that is adapted to be interfaced with a low cost, compact fiber-optic transmission system to provide an accurate indication of a sensed physical parameter (e.g. temperature) of a remote sample. The sensor is fabricated so as to include a semiconductor material that has optical-wavelength-dependent filter characteristics that may be varied as a function of a physical parameter such as temperature.

In one embodiment, a graded optical filter fabricated by using thin-film deposition techniques on an amorphous semiconductor material, provides position responsive high-pass filter characteristics. Such filter characteristics are then utilized by moving a light source as a function of a physical parameter and generating an optical signal therefrom having a cutoff frequency dependent upon the position of the light source.

In another embodiment, the temperature dependent frequency cutoff characteristics in the absorption edge of amorphous selenium, are utilized more directly in an optical temperature sensor. The optical utilization of amorphous semiconductor material is a particularly advantageous feature of the invention in reducing the cost and complexity of semiconductor optical filters.

4 Claims, 7 Drawing Figures

METHOD AND APPARATUS FOR AN OPTICAL SENSOR UTILIZING SEMICONDUCTOR FILTERS

This is a division of application Ser. No. 5,532 filed Jan. 22, 1979, now abandoned.

BACKGROUND OF THE INVENTION

1. Field of the Invention

This invention relates to a method for fabricating and to the resulting apparatus for implementing a unique semiconductor optical filter sensor that is suitable for providing accurate representations of a physical parameter in an optical sensor system.

2. Prior Art

Conventional sensors which are adapted to measure various physical characteristics of a sample, typically provide an analog electric output signal. Such conventional analog sensors may be limited in some applications because of their relatively large size. Moreover, systems that have heretofore been interfaced with sensors of the prior art are relatively expensive to fabricate, are often not capable of carrying sufficiently wide bandwidth signals, and lack immunity to electromagnetic and/or electrostatic interference.

Devices that are known to those skilled in the art and which are generally adapted to optically convey information that is transmitted by means of incident light beams to measure various physical parameters (such as temperature, pressure, etc.) operate in a manner involving a plurality of reflections and splittings of a single beam of incident light so that interference and support of the components of the incident light may occur numerous times. Therefore these devices have the disadvantageous characteristic of intensity variations that are inimical to the accuracy of the signal representation of the sensed parameter.

An example of an optical sensor that is interfaced with a fiber optic transmission system to provide accurate digital representations of a physical parameter from a remote sample can be found in U.S. patent application Ser. No. 928,223 entitled "FIBER OPTIC TEMPERATURE SENSOR", filed July 26, 1978. However, nothing is known in the prior art which shows or suggests the claimed method and resulting apparatus for utilizing a semiconductor material that has optical-wavelength-dependent filter characteristics that may be varied as a function of a physical parameter such as temperature. Furthermore, nothing is known in the prior art which applies amorphous semiconductor material in an optical filter for any purpose, let alone for use in an apparatus for sensing physical parameters, such as that disclosed and claimed below.

SUMMARY OF THE INVENTION

Briefly, and in general terms the invention may be summarized as a method and apparatus for implementing a unique optical sensor that comprises a semiconductor optical fiber that has optical-wavelength-dependent characteristics that may be varied as a function of a physical parameter such as temperature. In a first embodiment, the invention utilizes a graded optical filter fabricated by depositing films of amorphous semiconductor material and changing the annealing temperature as a function of the linear position along the semiconductor film so that the resultant graded filter has a cutoff frequency for the incoming optical signal that varies as a function of the position of that signal with respect to the filter. Consequently, any physical parameter that can be sensed by a device which can be made to shift a white light source, such as a fiber optic port, in response to the status of the physical parameter, generates an optical signal, the frequency characteristics of which vary as a function of that status. A resultant sensor signal will have spectral characteristics which vary with the status of the sensed parameter and which can be applied to a detector comprising a plurality of photo-detectors, each adapted to receive a different portion of the spectrum of the optical signal. The output of the photo-detectors will therefore be indicative of the sensed parameter signal transferred from the sensor at a remote location.

In a second embodiment, the observed relationship between the cutoff frequency of the absorption edge characteristics of amorphous selenium are more directly utilized in an optical sensor for varying the frequency cutoff characteristics of incident broadband light as a function of the change of status of the sensed physical parameter. Although neither of the disclosed embodiments is necessarily limited to use of amorphous semiconductor material, because the utilization of crystalline material in a straightforward sandwiching of optical filter structures is contemplated within the scope of the invention, the novel application of amorphous semiconductor material for optical filters is particularly advantageous because of the reduction in cost and complexity in the manufacturing process.

Irrespective of which embodiment of the invention is utilized, and also irrespective of whether the semiconductor material selected for the invention is crystalline or amorphous, the invention provides the important advantage of a low cost, compact optical sensor system that may, by way of example, utilize fiber optic transmission means for providing an accurate representation of a remotely sensed physical parameter without the aforementioned disadvantages of the prior art such as, inaccuracy due to light intensity variation, and electromagnetic or electrostatic interference that is inherent in non-optical sensor systems.

The means by which the above noted advantages as well as others have been achieved, will be best understood by reference to the detailed description of the invention and the accompanying drawings in which:

DETAILED DESCRIPTION OF THE INVENTION

In the following detailed description, the discussion of the invention is in three parts. In the first such part, the discussion relates primarily to a first embodiment of the invention and refers to FIGS. 1 and 2. In the second such part, the discussion relates primarily to a second embodiment of the invention and utilizes FIGS. 3 and 4. In the third such part, the discussion pertains to the utilization of amorphous semiconductor material as an advantageous optional implementation in which the material characteristics still provide the requisite feature for carrying out the invention but at substantially reduced cost and complexity of fabrication.

Figure 1:
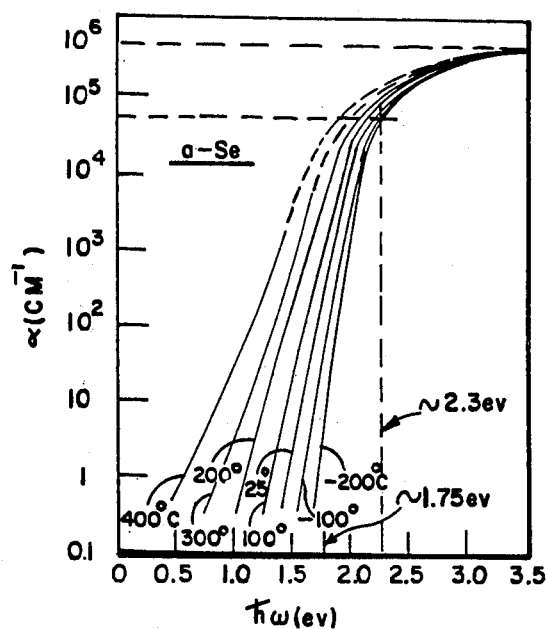
FIG. 1 is a graph illustrating the optical absorption edge characteristics of a semiconductor material suitable for use in the present invention.
Figure 2:
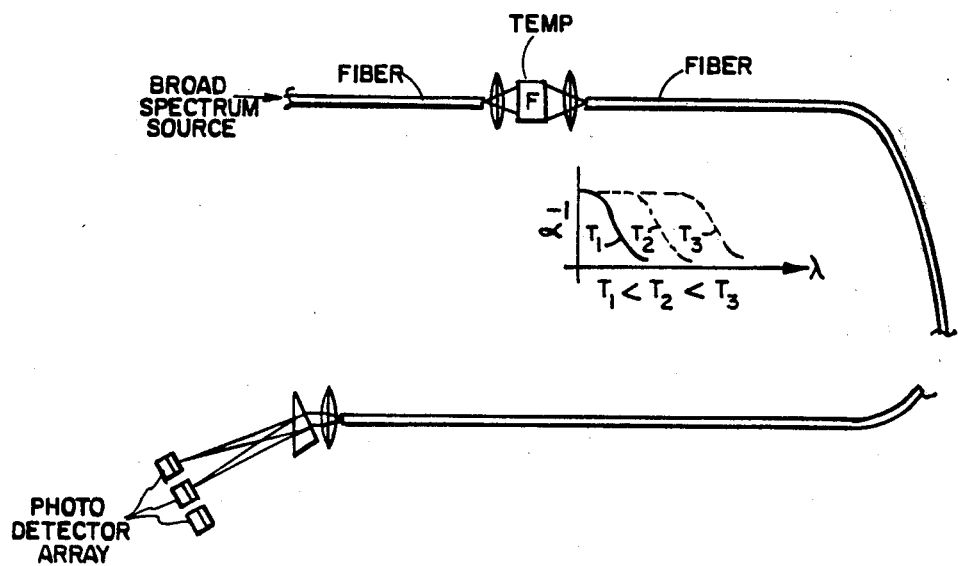
FIG. 2 is an illustrative example of the manner in which a temperature-dependent optical filter of the present invention may be utilized in a fiber optic transmission system for reporting the temperature status of a sample to a reporting station at a remote location.

Referring now concurrently to FIGS. 1 and 2 which pertain to a first embodiment of the invention, FIG. 1 illustrates the manner in which the optical frequency absorption characteristics of amorphous selenium semiconductor material change with temperature. FIG. 2 illustrates the manner in which a semiconductor device that utilizes these temperature dependent frequency cutoff characteristics may be used in an optical sensor system that employs fiber optic transmission lines for transferring an optical signal representative of the status of the sensed parameter to a remote location for detection and further processing.

In FIG. 1 the abscissa axis is photon energy expressed as the product of Planck's constant times the frequency of light (in electron volts eV) and the ordinate axis is the absorption coefficient $\alpha$ expressed as 1/cm.

As indicated in FIG. 1, amorphous semiconductor material exhibits very high absorption coefficients at or above a photon energy level of about 3.0 electron volts. However, as further illustrated in FIG. 1, the absorption coefficient is reduced by approximately an order of magnitude at a photon energy of 2.3 electron volts for temperature of about $-200$ degrees centigrade. Also shown in FIG. 1 is that the absorption coefficient is reduced by an order of magnitude at a photon energy of 1.75 electron volts for a temperature of $+400$ degrees centigrade. Thus, considering a reduction in the absorption coefficient by a factor of 10 as a cutoff point, the wavelength cutoff point for amorphous selenium semiconductor material at a temperature of $+400$ degrees centrigrade is about 7100 Å. Thus at this temperature, the filter will pass virtually all visible light energy. However, this same material at a temperature of $-200$ degrees centigrade, will have a cutoff point at a wavelength of 5400 Å resulting in substantial blockage of a predominant part of the light spectrum towards the visible red limit. Of course, it will be understood that the numbers represented in FIG. 1 are approximations and that they may vary considerably depending upon the selection of semiconductor material and the method of optical filter manufacture. However, they do illustrate the substantial change in optical cutoff wavelength as a function of temperature.

The means by which the temperature dependent cutoff characteristics illustrated in FIG. 1 may be used in an optical sensor light transmission system are illustrated conceptually in FIG. 2. As indicated in FIG. 2, a broad spectrum source of optical energy is applied by means of an optical fiber to a lens system which includes a semiconductor filter such as may be manufactured using amorphous selenium material the characteristics of which have been discussed in conjunction with FIG. 1. The output of the filter is then applied, using appropriate lens structure, to another fiber optic transmission line which carries the filtered optical signal to a remote station where the light is applied to a suitable photo-detector array through a selected lens and prism arrangement as shown in FIG. 2.

Clearly, as the temperature in the immediate vicinity of the optical filter increases, the wavelength at the cutoff of the filter also increases and as a result, additional spectral components of the light energy towards the visible red limit of light are transmitted to the photo-detector array which is located remotely with respect to the temperature sensor. Of course, the actual number of photo-detectors in the array will be selected for the degree of resolution required over the temperature range in which the sensor is designed to operate. The electrical signal output of the photo-detector array may be monitored in either an analog or a digital format for an indication of the status of the physical parameter being sensed. In the illustration of FIG. 2, this parameter is temperature.

It will be understood that the embodiment of the invention illustrated in FIGS. 1 and 2 is not necessarily limited to sensing temperature, but that it may be applied to virtually any physical parameter that affects the wavelength cutoff characteristics of the filter absorption coefficient. By way of example, it has been observed that changes in pressure also vary the frequency cutoff behavior of certain optical semiconductor materials. Accordingly, a system virtually identical to that illustrated in FIG. 2 could be utilized by means of the present invention to monitor pressure in the same manner. Furthermore, it will be understood that the system of FIG. 2 is not necessarily limited to the use of a photo-detector array as the means for demodulating the color modulated optical signal. By way of example, a holographic processor may be utilized for that purpose as described and claimed in applicants' copending application, Ser. No. 005,619 filed Jan. 22, 1979.

Figure 3:
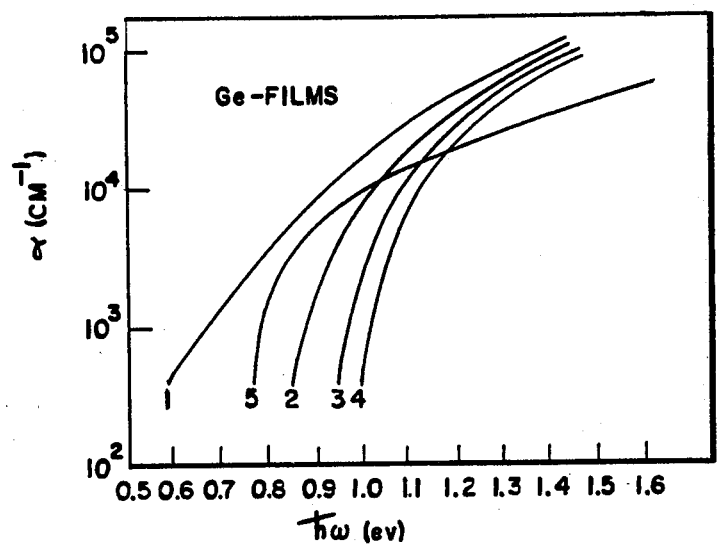
FIG. 3 is a graph illustrating the optical absorption band edge characteristics that vary with the annealing temperature of a semiconductor material suitable for use in the present invention.
Figure 4:
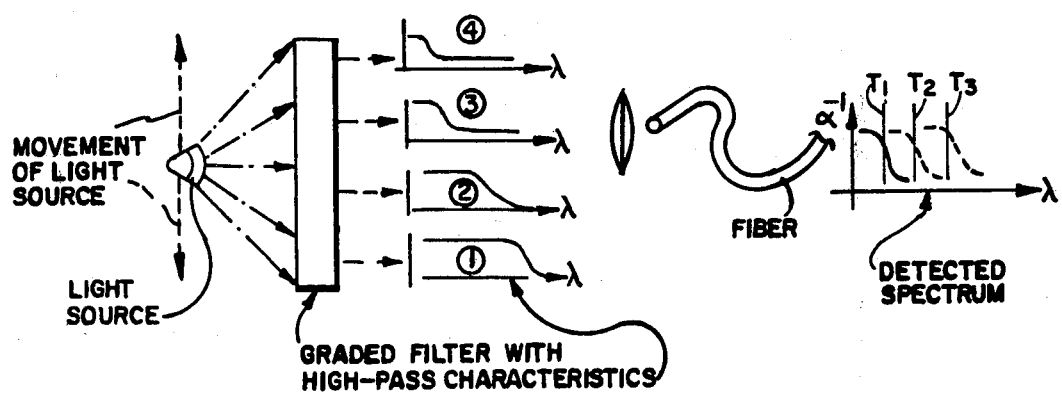
FIG. 4 is an illustration of the manner in which a graded filter, fabricated in accordance with the present invention by utilizing the annealing temperature characteristics illustrated in FIG. 3, may be utilized for reporting the status of any physical parameter that can be expressed in the form of the position of a light source.

Referring concurrently to FIGS. 3 and 4, there is shown therein an alternative embodiment of the present invention also utilized as an optical sensor for transmitting signals indicative of the status of a physical parameter to a remotely located receiving station. In this alternative embodiment, the invention also utilizes the variation of absorption edge wavelength cutoff characteristics of a semiconductor material. However, in this case the dependence of the shape and level of the absorption edge of semiconductor material on the preparation and thermal history of the semiconductor sample is exploited. This structure-sensitive property is particularly evident in thin film semiconductors. FIG. 3 illustrates the dependence of the absorption constant of amorphous germanium films in the region of the absorption edge on the temperature of annealing. More particularly, curve 1 of FIG. 3 illustrates the dependence of the absorption edge of amorphous germanium on the temperature annealing where the germanium film was deposited at a temperature of 20 degrees centigrade (non-annealed). On the other hand, curves 2, 3, 4 and 5 illustrate the variation in absorption characteristics at annealing temperatures of 200 degrees centigrade, 300 degrees centigrade, 400 degrees centigrade and 500 degrees centigrade, respectively. It is to be noted that during the annealing process at 500 degrees centigrade the sample crystallized. This accounts for the apparently anomalous behavior of curve 5 in comparison to the other four curves.

The substantial variation in cutoff wavelength for a reduction in absorption coefficient by, for example, an order of magnitude, is utilized in the method of the present invention to fabricate a graded filter having characteristics that vary along its dimensional structure. Such a graded filter having variable high-pass characteristics is illustrated in conceptual form in FIG. 4.

As illustrated in FIG. 4 a graded high-pass filter fabricated to exploit the variation of wavelength cutoff characteristics with annealing temperature, has a cutoff wavelength λ that varies along the length of the filter so that movement of a broadband light source would result in different spectral characteristics being transferred along a fiber to a remote location for detection. In such an application, the light source movement may be caused by any number of varying physical parameters. By way of example, the open port of a fiber optic transmission line might be affixed to a bimetallic strip so that the port position is a function of temperature. In any case, the spectral characteristics illustrated in FIG. 4, vary as a function of the position of the light source. As shown in FIG. 4, for a light source located at the uppermost portion of the graded filter, and assuming that portion of the filter is constructed by annealing amorphous germanium film in accordance with curve 4 of FIG. 3, that portion of the filter would have a wavelength cutoff characteristic represented by graph 4 of FIG. 4. Similarly, the other portions of the graded filter would have corresponding longer wavelength cutoff characteristics as illustrated respectively in graphs 3, 2 and 1 of FIG. 4, which correspond to curves 3, 2 and 1 respectively of FIG. 3. The variation of the wavelength cutoff characteristic with position in the graded filter, can be made to follow virtually any dimensional function desired. For example, the filter can be divided into discrete linear portions wherein the wavelength characteristic is made to vary as a step function as the border between such portions is crossed by the position of the light source. Alternatively, a graded filter can be made to vary gradually in wavelength cutoff characteristics utilizing film deposition techniques in which the annealing temperature is gradually changed in accordance with some selected continuous curve.

Irrespective of the manner in which the graded filter is constructed, the result of detecting a variation in the position of the light source is about the same. The implementation of the graded filter is illustrated on the right most portion of FIG. 4 where it is shown that the output of the filter is applied to a fiber optic cable through an appropriate lens structure. The light signal contained therein has a detectable signal spectrum which varies with temperature in the same manner as that previously discussed for the first embodiment of the invention disclosed in FIGS. 1 and 2.

The above discussion of the invention has dealt with utilization of amorphous semiconductive materials. Crystalline semiconductive materials, also suitable for the present invention, are often difficult to deposit on various substrates. Furthermore, there is still some question as to whether or not some complicated compound semiconductor materials can be grown in crystalline form in sufficiently large crystals for the purpose of optical filtering. In addition, amorphous semiconductor films are easier to fabricate and provide relaxed requirements on lattice constant matching with a variety of substances. There are some differences in optical properties between the crystalline and amorphous states of a semiconductor. However, many features of the crystalline semiconductor also exist in the amorphous state. There is a filled valance band, roughly derived from bonding orbitals, and an empty conduction band derived from antibonding orbitals. In a pure, non-vibrating crystal, and in the one-electron approximation, the wave functions in the two bands may be written as the product of a plane wave of definite wave vector, $\overline{K}$, and a function having the periodicity of the lattice. In any real crystal, however, there will be defects (e.g., impurities, vacancies, intersitials, dislocations), which scatter the Bloch waves, so that the wave vector, $\overline{K}$, is only an approximate quantum number characterizing the states. In the amorphous material, $\overline{K}$ is not a good quantum number of the electronic states. Some remnants of $\overline{K}$-conservation may persist, however, because states in a given energy range may contain wave vectors associated with particular portions of the Brillouin zone of the ordered structure.

Figure 5:
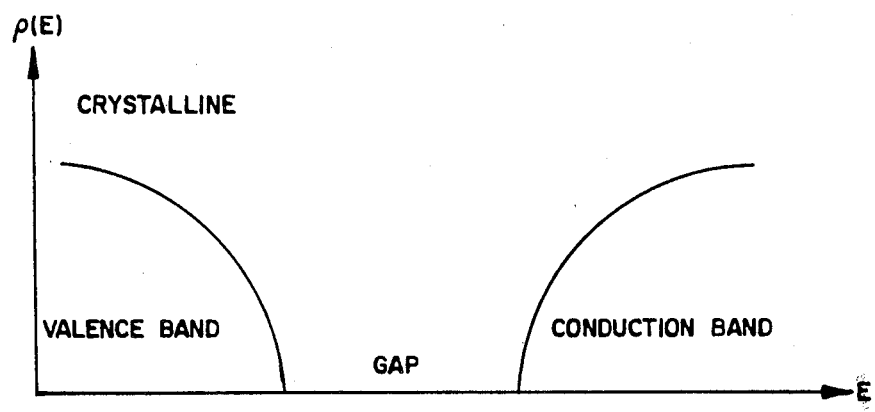
FIGS. 5, 6 and 7 are graphical illustrations that compare certain physical characteristics of both crystalline and amorphous semiconductor materials and which illustrate the applicability of amorphous semiconductor material for use in the present invention.
Figure 6:
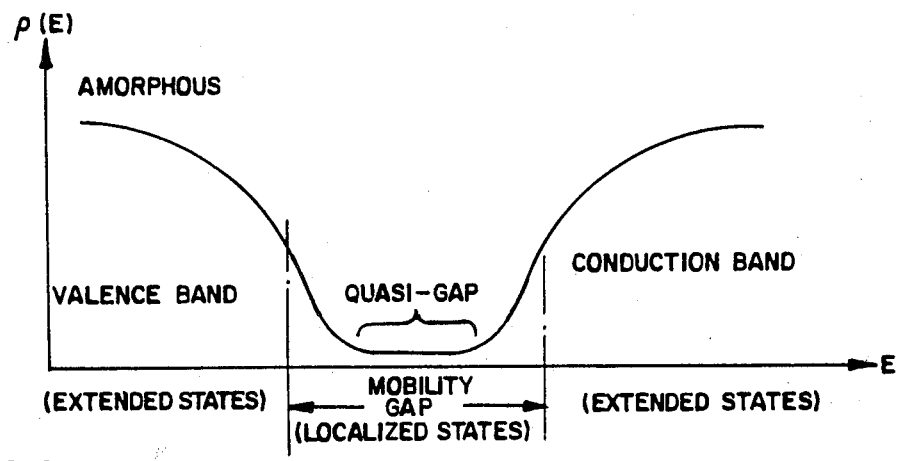

The rough features of the density of states will generally be the same in the amorphous material as in the crystalline, provided that the short-range ordering of the atoms is similar for the two cases. Sharp features of the crystalline density of the states, arising from critical points in the Brillouin zone, where there is a vanishing of the gradient of the energy value with respect to the wave vector, would, of course, be considerably smoothed out in the amorphous system. Corresponding to the energy gap in the crystal, there will be a quasi-gap in the energy band of amorphous material, where the density of states is much smaller than in the valence and condition bands. In this respect compare FIGS. 5 and 6.

Figure 7:
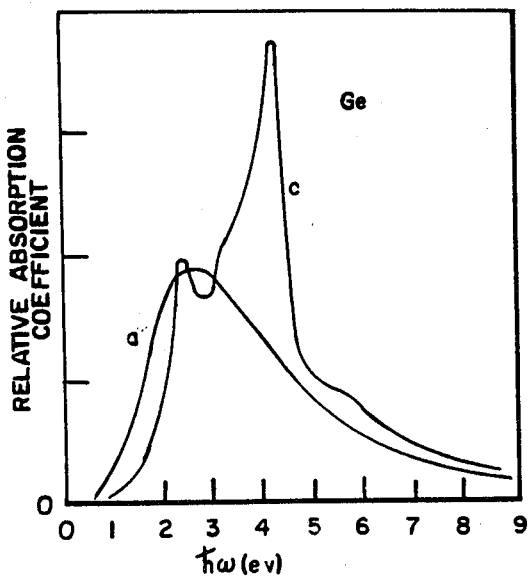

FIG. 7 provides a typical comparison example of the difference in optical properties between crystalline (c) and amorphous (a) solids. In this case the solid is germanium. The principle absorption band of amorphous germanium is situated approximately in the same energy range as that of crystalline germanium, but it lacks the sharp structural characteristics of crystals. With the loss of the long range order, the $\overline{K}$ vector ceases to be a good quantum number and is only partially conserved during optical transitions. However, the amorphous semiconductor material does provide absorption band characteristics which may be utilized in the manner previously discussed in conjunction with FIGS. 1 and 3.

It will now be apparent that what has been disclosed herein is a method and resulting apparatus for implementing a unique optical sensor fabricated to include a semiconductor material that has optical-wavelength-dependent filter characteristics that may be varied as a function of a physical parameter such as temperature. Two embodiments of the invention have been disclosed. In the first embodiment, the temperature dependent frequency cutoff characteristics in the absorption edge of amorphous selenium are utilized in an optical sensor wherein the cutoff characteristics vary as a function of a physical parameter and produce a responsive spectral component variation which may be reported to a remote station by a fiber optical transmission cable. In a second embodiment, a graded optical filter, fabricated by using thin-film deposition techniques on an amorphous semiconductor material, provides position responsive high-pass filter characteristics which are then utilized by moving a broadband light source relative to the filter. The movement of the light source is a function of a physical parameter so that the output of the graded optical filter is an optical signal having a cutoff frequency dependent upon the variation in the sensed physical parameter.

It will be apparent that while preferred embodiments of the invention have been disclosed, various modifications and changes may be made without departing from the true spirit and scope of the invention. For example, the disclosed optical filter, although particularly suitable for applications in optical sensor systems, may also be used in a variety of applications related to communications much like electronic active filters.

Having thus set forth preferred embodiments of the present invention, what is claimed is:

1. A method for fabricating a sensor for use in an optical sensor system that utilizes a position variable light beam for sensing the status of a physical parameter and a transmission means for reporting the status to a detector, the method comprising the steps of:
   1. selecting a semiconductor material having optical wavelength cutoff characteristics at the edge of the absorption band, which vary with annealing temperature,
   2. annealing a region of said semiconductor material at a selected annealing temperature,
   3. repeating step 2 hereof for additional regions of semiconductor material and modifying the annealing temperature for each such additional region relative to the annealing temperature of the previous region, and
   4. selecting an annealing temperature for each said region to provide a contiguous composite of such regions which, in combination, provide an optical filter having a wavelength cutoff characteristic that varies with position of said light beam relative to said filter.

2. The method of fabricating a sensor as defined in claim 1, wherein said semiconductor material is germanium.

3. The method of fabricating a sensor as defined in claim 2, wherein said germanium semiconductor material is in an amorphous state.

4. The method of fabricating a sensor as defined in claim 1, comprising the additional step of depositing each said region as a thin film is an amorphous state.

* * * * *